United States Patent
Kwak

(10) Patent No.: US 6,877,819 B1
(45) Date of Patent: Apr. 12, 2005

(54) TIRE CLAMP SUBSTITUTING FOR SPARE TIRE

(76) Inventor: Sang Ho Kwak, Bongcheon 1-dong, Kwanak-gu, Seoul 151-829 (KR)

( * ) Notice: Subject to any disclaimer, the term of this patent is extended or adjusted under 35 U.S.C. 154(b) by 0 days.

(21) Appl. No.: 10/754,312

(22) Filed: Jan. 9, 2004

(30) Foreign Application Priority Data

Nov. 1, 2003 (KR) .............................. 10-2003-0077172

(51) Int. Cl.$^7$ .............................................. B60B 11/10
(52) U.S. Cl. .................................... 301/38.1; 301/40.4
(58) Field of Search ............................. 301/38.1, 39.1, 301/40.3, 40.4; 305/7, 19; 152/185.1, 187

(56) References Cited

U.S. PATENT DOCUMENTS

| | | | | |
|---|---|---|---|---|
| 1,667,820 A | * | 5/1928 | Reinsberg et al. | 301/38.1 |
| 1,799,567 A | * | 4/1931 | Pruden | 301/39.1 |
| 2,214,303 A | * | 9/1940 | Kipen | 188/5 |
| 2,226,521 A | * | 12/1940 | McNamara | 414/430 |
| 2,228,423 A | * | 1/1941 | Ticktin et al. | 301/47 |
| 2,247,717 A | * | 7/1941 | Sutter | 414/430 |
| 2,573,728 A | * | 11/1951 | Pugh, Sr. | 414/430 |
| 2,985,485 A | * | 5/1961 | McNabb | 301/38.1 |
| 3,866,978 A | * | 2/1975 | Fine | 301/40.3 |
| 5,044,415 A | * | 9/1991 | Ishihara | 152/228 |
| 5,407,255 A | * | 4/1995 | Feldman | 301/38.1 |

* cited by examiner

Primary Examiner—Russell D. Stormer
(74) Attorney, Agent, or Firm—Ladas & Parry LLP

(57) ABSTRACT

A tire clamp substituting for a spare tire for a vehicle is provided. When a tire is punctured, the punctured tire is substituted with a spare tire. In this invention, a tire clamp is substituted for a spare tire. The tire clamp includes: a frame box; a plurality of clamping portions which are protruded radially on the frame box and are installed symmetrically with each other, each having a clamp shaft on the inner circumference of which a threaded hole is formed, a clamp arm which is formed in the front side of one end of the clamp shaft and clamps the edge of a tire, and a fitting arm which is formed in the rear side of one end of the clamp shaft; a plurality of first bevel spindles each having a first spindle shaft which is geared and engaged with the threaded hole of the clamp shaft and a first bevel gear which is formed in one end of the first spindle shaft; a second bevel spindle having a second spindle shaft which is protruded outwards from the center of the frame box and a second bevel gear which is formed on one end of the second spindle shaft and simultaneously geared and engaged with the first bevel gears, to thereby make the first bevel spindles rotate simultaneously; and a handle for making the second bevel spindle rotate.

4 Claims, 4 Drawing Sheets

TIRE CLAMP SUBSTITUTING FOR SPARE TIRE

BACKGROUND OF THE INVENTION

1. Field of the Invention

The present invention relates to a tire clamp for moving a vehicle as a substitute for a spare tire, and more particularly, to a tire clamp substituting for a spare tire, which is mounted in a punctured tire in a vehicle so that the vehicle can move by a predetermined distance.

2. Description of the Related Art

As a standard of living gets higher and a sphere of activity is extended, automobiles have become the necessaries of life. Automobiles, were used for business activity in the past, but are used for attending and leaving the offices, or enjoying leisures. As a result, each individual's driving time and opportunity has increased.

Accordingly, as we drive an automobile frequently, we may suffer from difficulties relating to the automobile. Among them, the punctured tire is one of the big difficulties. When a tire is punctured at night or on a heavily traveled road, it is very difficult and dangerous to replace the punctured tire by a new tire. In particular, it is difficult for unskilled persons to replace the punctured tire by a new tire. Thus, in order to replace the punctured tire by a new one, the automobile should be driven to a mechanic workshop nearby or a safe place to replace the punctured tire by a new one. In this case, since it is very difficult and dangerous for a driver to drive an automobile with at least one tire punctured, he or she may have the considerable difficulty in driving the automobile car.

SUMMARY OF THE INVENTION

To solve the above problems, it is an object of the present invention to provide a tire clamp for moving a vehicle as a substitute for a spare tire in which the tire clamp is easily mounted in a punctured tire so that an automobile can be driven to a mechanic workshop nearby.

To accomplish the above object of the present invention, there is provided a tire clamp substituting for a spare tire for moving an automobile with at least one tire punctured, the tire clamp comprising: a frame box; a plurality of clamping portions which are protruded radially on the frame box and are installed symmetrically with each other, each having a clamp shaft on the inner circumference of which a threaded hole is formed, a clamp arm which is formed in the front side of one end of the clamp shaft and clamps the edge of a tire, and a fitting arm which is formed in the rear side of one end of the clamp shaft; a plurality of first bevel spindles each having a first spindle shaft which is geared and engaged with the threaded hole of the clamp shaft and a first bevel gear which is formed in one end of the first spindle shaft; a second bevel spindle having a second spindle shaft which is protruded outwards from the center of the frame box and a second bevel gear which is formed on one end of the second spindle shaft and simultaneously geared and engaged with the first bevel gears, to thereby make the first bevel spindles rotate simultaneously; and a handle for making the second bevel spindle rotate.

The tire clamp according to the present invention further comprises: a fitting bracket in which the fitting arms are rotatably fitted around the axis of the frame box and the clamp arms are rotatably supported around the axis of the frame box; a plurality of bearings which are in contact with the lower end surface of the clamp arms and both surfaces of the fitting arms and are rotatably installed in the fitting bracket; and a plurality of auxiliary wheels which are installed in the lower portion of the fitting bracket. In this case, it is preferable that an engagement piece is installed in the end of each fitting arm, and an engagement groove with which the engagement piece is engaged is formed in the fitting bracket.

In the present invention, a rubber pad is attached on the surface of each clamp arm.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

Figure 1:
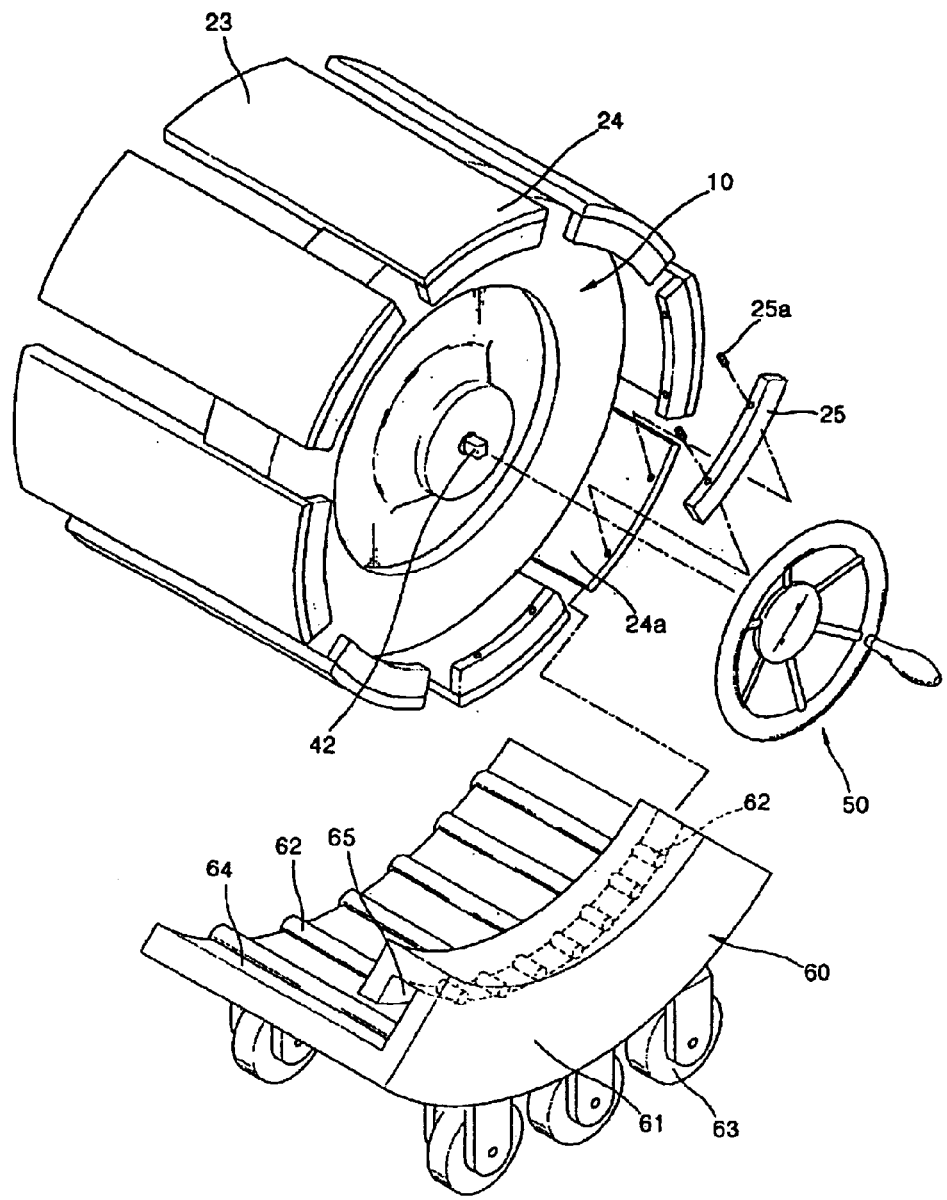
FIG. 1 is a perspective view showing a tire clamp substituting for a spare tire according to the present invention, to thereby make a vehicle move.
Figure 2:
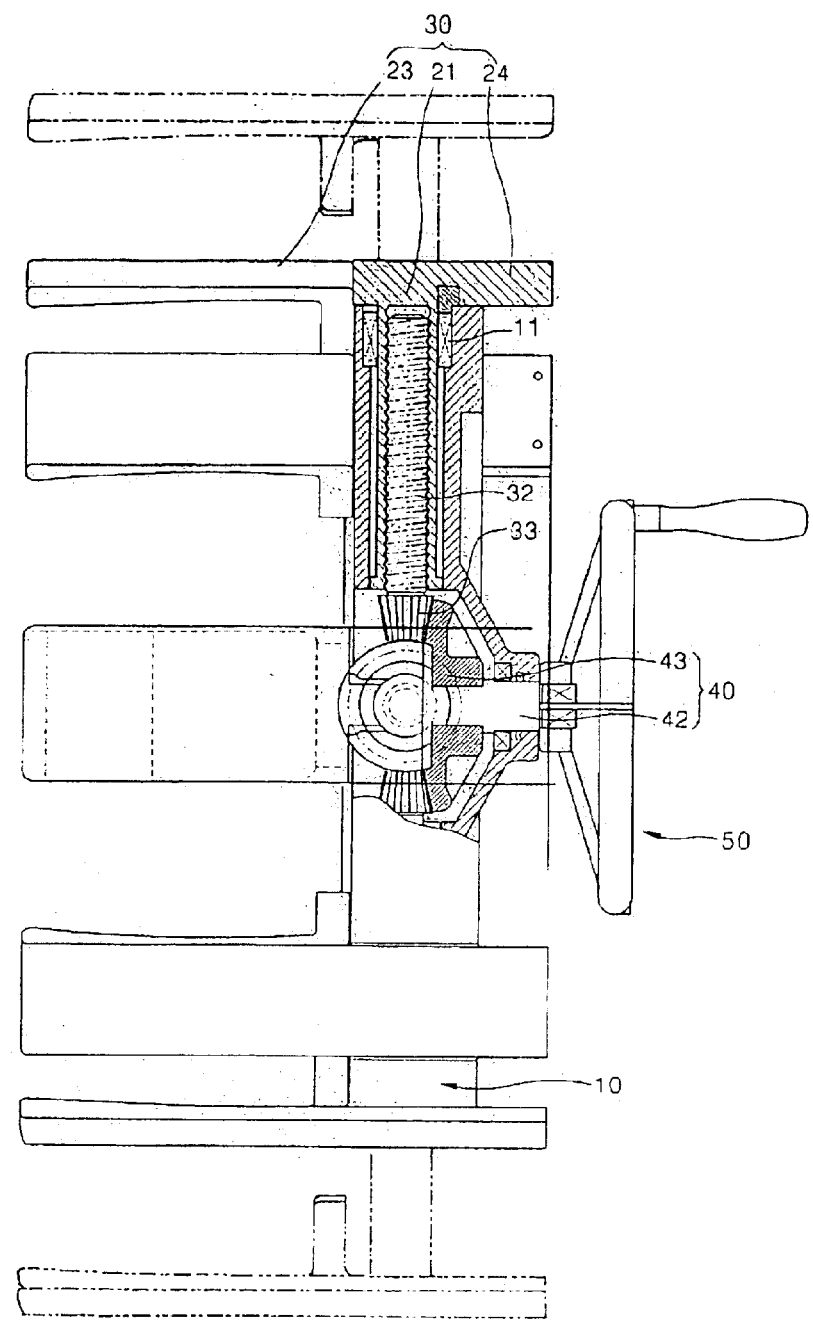
FIG. 2 is a partially cross-sectional view showing the tire clamp of FIG. 1.

A tire clamp substituting for a spare tire according to an embodiment of the present invention will be described with reference to the accompanying drawings.

Referring to FIGS. 1 through 4, a tire clamp substituting for a spare tire according to an embodiment of the present invention a frame box 10, eight clamping portions 20 which are protruded radially on the frame box 10, eight first bevel spindles 30 which rotate to make the clamping portions 20 protrude and intrude, a second bevel spindle 40 which makes the first bevel spindles 30 rotate simultaneously, and a handle 50 for making the second bevel spindle 40 rotate forward and backward. Here, a movable bracket 60 provided with auxiliary wheels 63 is selectively installed in the frame box 10.

The frame box 10 has a generally cylindrical shape. On the edge of the frame box 10 are formed eight first installation holes which reach at the center of the frame box 10. A second installation hole is formed on the center of the rear surface of the frame box 10. A clamp shaft 21 to be described later is installed in the first installation hole so that the clamp shaft 21 radially protrudes or intrudes. In this case, it is preferable that a needle bearing 11 is installed between the first installation hole and the clamp shaft 21, so that the clamp shaft 21 protrudes or intrudes smoothly. Also, a second spindle shaft 42 of the second bevel spindle is installed in the second installation hole.

The eight clamping portions 20 each have a clamp shaft 21 which is protruded or intruded radially into the respective first installation holes on the frame box 10, a clamp arm 23 which is formed in the front side of one end of the clamp shaft and clamps the edge of a tire T, and a fitting arm 23 which is formed in the rear side of one end of the clamp shaft 21. Here, on the inner circumference of the clamp shaft 21 is axially formed a threaded hole with which a first spindle shaft 32 to be described later is threadedly engaged. The eight clamping portions 20 are installed symmetrically with each other.

The first bevel spindles each have a first spindle shaft 32 which is geared and engaged with the threaded hole of the clamp shaft 21 and a first bevel gear 33 which is formed in one end of the first spindle shaft 32.

The second bevel spindle 40 has a second spindle shaft 42 which is protruded outwards from the center of the frame box 10 and a second bevel gear 43 which is simultaneously geared and engaged with the first bevel gears 33.

The handle 50 is coupled with the second spindle shaft 42 which is protruded outwards from the frame box 10.

The movable bracket 60 includes a fitting bracket 61 in which the fitting arms 24 are rotatably fitted around the axis of the frame box 10 and the clamp arms 23 are rotatably supported around the axis of the frame box 10, a plurality of bearings 62 which are in contact with the lower end surface of the clamp arms 23 and both surfaces of the fitting arms 24 and are rotatably installed in the fitting bracket 61, and a plurality of auxiliary wheels 63 which are installed in the lower portion of the fitting bracket 61. In this case, a fitting groove 64 with which the fitting arm 24 is engaged is formed in the fitting bracket 61.

It is preferable that an engagement piece 25 is installed in the end of each fitting arm 24, so that the fitting bracket 61 is not separated from the fitting arm 24, and an engagement groove 65 with which the engagement piece 25 is engaged is formed in the fitting groove 64. Here, a throughhole is formed in the engagement piece 25 and a threaded groove 24a with which a screw 25a penetrates the throughhole is engaged is formed in the fitting arm 24.

Figure 4:
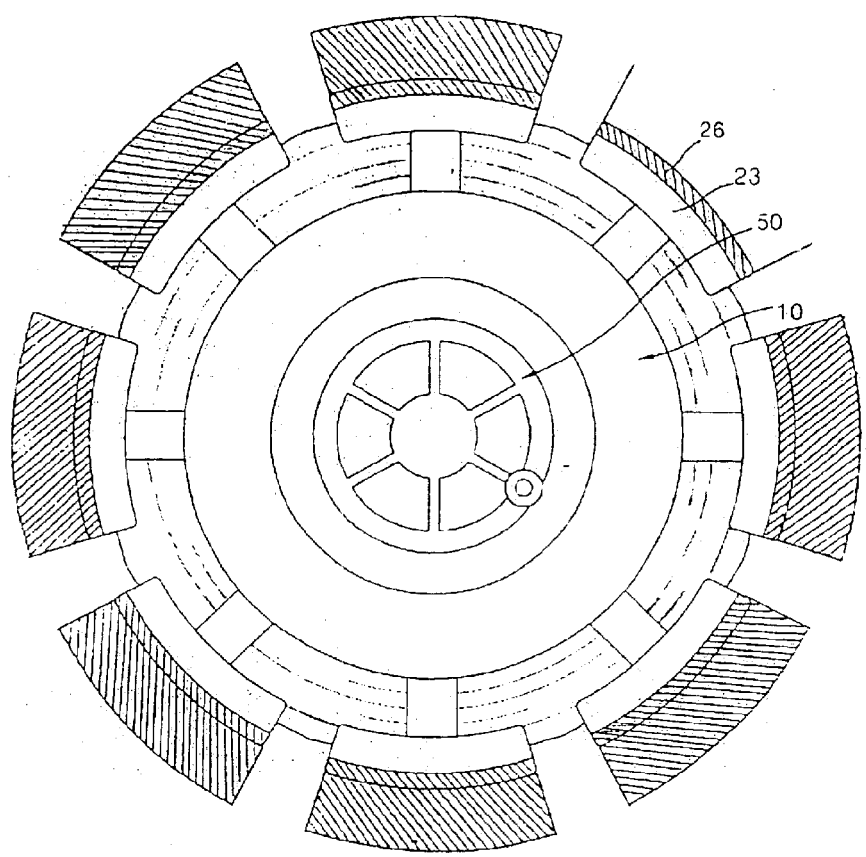
FIG. 4 is a cross-sectional view showing a state where a rubber pad is attached on the clamp arm of FIG. 1.

Meanwhile, as shown in FIG. 4, a rubber pad 26 is attached in the lower end surface of each clamp arm 23 and both surfaces of each fitting arm 24, so that the tire clamp can elastically contact the ground. In this case, since the rubber pads 26 attached on the clamp arms 23 and the fitting arms 24 make the wheel axis of a vehicle spaced from the ground without using the movable bracket 60, the vehicle can be driven by a short distance.

An operation of the tire clamp substituting for a spare tire having the above-described structure will be described below.

When a wheel tire in a vehicle is punctured, a tire clamp substituting for a spare tire is coupled with the punctured tire. When a handle 50 is made to rotate, a second spindle shaft 42 and a second bevel gear 43 are made to rotate. As a result, a first bevel gear 33 and a first spindle shaft 32 are made to rotate by the second bevel gear 43. Accordingly, the clamp shaft 21 which is geared and engaged with the first spindle shaft 32 makes the clamp arms 23 protruded from the edge of the frame box 10. By doing so, the clamp arms 23 can sufficiently get wider to enclose the edge of the punctured tire T.

Figure 3:
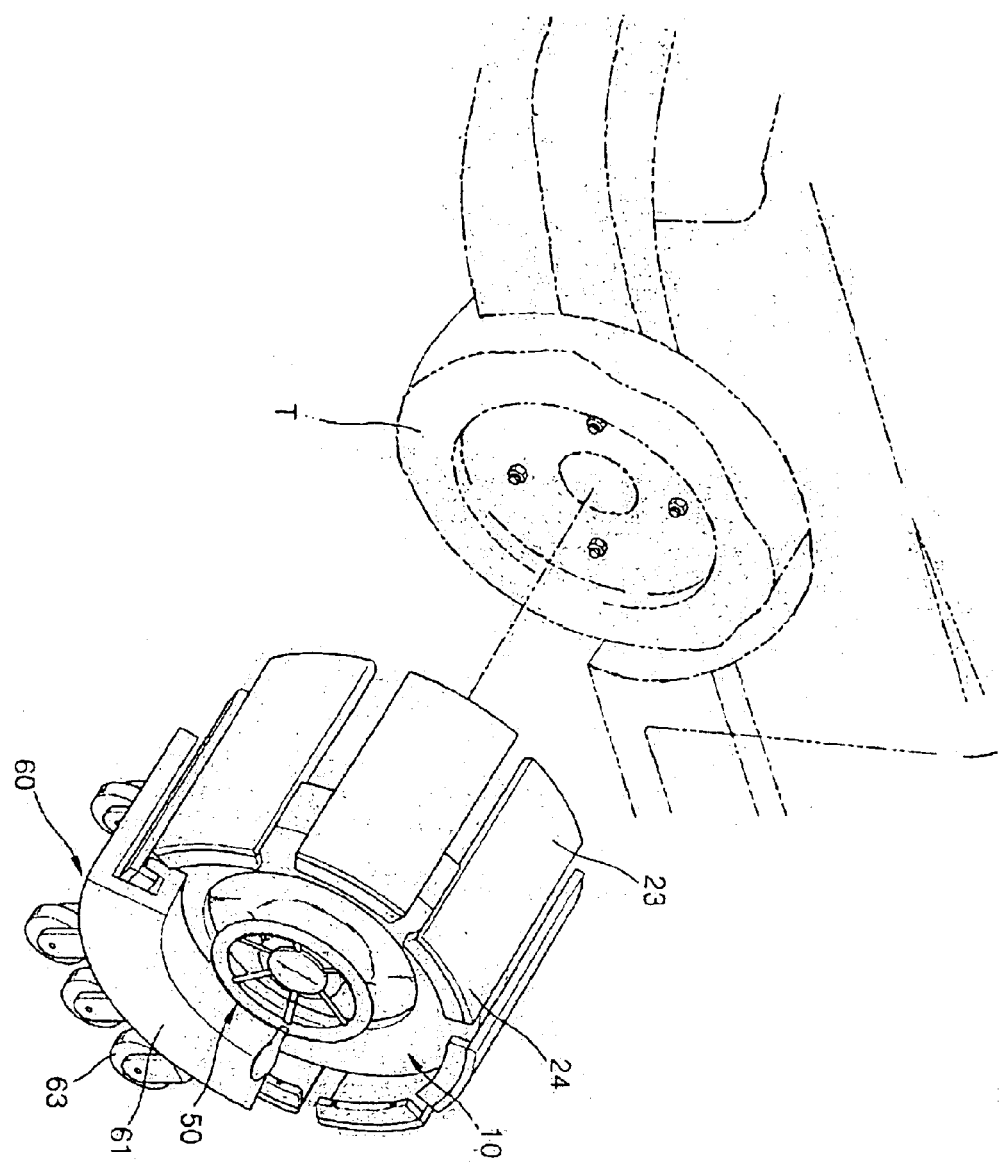
FIG. 3 is a perspective view showing a process of installing the tire clamp of FIG. 1 on a tire of a vehicle.

As shown in FIG. 3, the clamp arms 23 are positioned to enclose the edge of the punctured tire T, and then the handle 50 is made to turn reversely. Then, the clamp arms 23 clamp the punctured tire T firmly.

As described above, if the tire clamp is coupled with the punctured tire, the clamp arms 23 and the fitting arms 24 in the frame box 10 are made to rotate around the wheel shaft with respect to the movable bracket 60 contacting the ground. That is, if a vehicle moves while wheels rotate, the clamp arms 23 and the fitting arms 24 come in and out of the fitting grooves 54 in the fitting bracket 61. Accordingly, the frame box 10 is made to rotate with respect to the movable bracket 60. Here, since the lower end surface of each clamp arm 23 and both the surfaces of each fitting arm 24 contact each bearing 62, the frame box 10 rotate more smoothly with respect to the movable bracket 60. Accordingly, the movable bracket 60 slowly moves while rotating and supporting the frame box 10.

As described above, the clamp arms are sufficiently made to get wider by turning the handle and then positioned to enclose the edge of a punctured tire. Then, the handle is turned reversely to make the clamp arms clamp the punctured tire. In this manner, the tire clamp substituting for a spare tire can be easily coupled with the punctured tire. Thus, since even women or unskilled drivers can couple the tire clamp according to the present invention with a punctured tire even at night or on a heavy traffic road, the vehicle with the punctured tire can be easily driven to a mechanic workshop nearby.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. A tire clamp to be substituted for a spare tire for moving an automobile with at least one tire punctured, the tire clamp comprising:
    a frame box;
    a plurality of clamping portions which are protruded radially on the frame box and are installed symmetrically with each other, each having a clamp shaft on the inner circumference of which a threaded hole is formed, a clamp arm which is formed in the front side of one end of the clamp shaft and clamps the edge of a tire, and a fitting arm which is formed in the rear side of one end of the clamp shaft;
    a plurality of first bevel spindles each having a first spindle shaft which is geared and engaged with the threaded hole of the clamp shaft and a first bevel gear which is formed in one end of the first spindle shaft;
    a second bevel spindle having a second spindle shaft which is protruded outward from the center of the frame box and a second bevel gear which is formed on one end of the second spindle shaft and simultaneously geared and engaged with the first bevel gears, to thereby make the first bevel spindles rotate simultaneously; and
    a handle for making the second bevel spindle rotate.

2. The tire clamp according to claim 1, further comprising:
    a fitting bracket in which the fitting arms are rotatably fitted around the axis of the frame box and the clamp arms are rotatably supported around the axis of the frame box;
    a plurality of bearings which are in contact with the lower end surface of the clamp arms and both surfaces of the fitting arms and are rotatably installed in the fitting bracket; and
    a plurality of auxiliary wheels which are installed in the lower portion of the fitting bracket.

3. The tire clamp according to claim 1, wherein an engagement piece is installed in the end of each fitting arm, and an engagement groove with which the engagement piece is engaged is formed in the fitting bracket.

4. The tire clamp according to claim 1, wherein a rubber pad is attached on the surface of each clamp arm.

* * * * *